US012728483B2

(12) United States Patent
Paris

(10) Patent No.: US 12,728,483 B2
(45) Date of Patent: Sep. 8, 2026

(54) METHOD OF SEALING GLASS ASSEMBLY

(71) Applicant: CORNING INCORPORATED, Corning, NY (US)

(72) Inventor: Bertrand Paris, Painted Post, NY (US)

(73) Assignee: CORNING INCORPORATED, Corning, NY (US)

(*) Notice: Subject to any disclaimer, the term of this patent is extended or adjusted under 35 U.S.C. 154(b) by 579 days.

(21) Appl. No.: 18/233,438

(22) Filed: Aug. 14, 2023

(65) Prior Publication Data

US 2024/0058895 A1 Feb. 22, 2024

Related U.S. Application Data

(60) Provisional application No. 63/399,244, filed on Aug. 19, 2022.

(51) Int. Cl.

| | |
|---|---|
| ***B23K 26/20*** | (2014.01) |
| ***B23K 26/00*** | (2014.01) |
| ***B23K 26/60*** | (2014.01) |
| ***B23K 103/00*** | (2006.01) |
| ***B23K 103/16*** | (2006.01) |

(52) U.S. Cl.

CPC ........ *B23K 26/206* (2013.01); *B23K 26/0006* (2013.01); *B23K 26/60* (2015.10); *B23K 2103/166* (2018.08); *B23K 2103/54* (2018.08)

(58) Field of Classification Search

CPC .. B23K 26/206; B23K 26/0006; B23K 26/60; B23K 2103/166; B23K 2103/54; B23K 26/244; B23K 26/50; B23K 2103/172; C03C 27/08; B32B 37/06; B32B 37/10; B32B 37/12

See application file for complete search history.

(56) References Cited

U.S. PATENT DOCUMENTS

| | | | | |
|---|---|---|---|---|
| 4,782,209 A | 11/1988 | Caers et al. | | |
| 6,362,454 B1 * | 3/2002 | Liu | B23K 26/0665 219/121.73 | |
| 10,297,787 B2 | 5/2019 | Dejneka et al. | | |
| 2007/0170158 A1 * | 7/2007 | Greig | B23K 26/0869 219/121.64 | |
| 2019/0308270 A1 * | 10/2019 | Lu | B23K 26/0006 | |

FOREIGN PATENT DOCUMENTS

WO 2023/034138 A1 3/2023

OTHER PUBLICATIONS

Min, Z., et al., "A new sealing technology for ultra-thin glass to aluminum alloy by laser transmission welding method", Int J Adv Manuf Technol, 2021, vol. 115, pp. 2017-2035.

* cited by examiner

*Primary Examiner* — Elizabeth M Kerr
*Assistant Examiner* — Keith Brian Assante
(74) *Attorney, Agent, or Firm* — Amy T. Lang

(57) ABSTRACT

A method of sealing a glass assembly includes contacting a first glass substrate with a first metal foil to create a first contact location; directing a laser beam on a second surface of the first metal foil opposite the first contact location to bond the first glass substrate to the first metal foil and form a first bond location; rotating the glass assembly 180 degrees about a longitudinal axis of the glass assembly; contacting a second glass substrate with a second metal foil to create a second contact location; and directing the laser beam on a second surface of the second metal foil opposite the second contact location to bond the second glass substrate to the second metal foil and form a second bond location.

20 Claims, 11 Drawing Sheets

320
322
202
100
200
202a
210
324
340
222
342
214a
324
214
202b
216
200a
200b
204
300
+X
+Y

METHOD OF SEALING GLASS ASSEMBLY

This application claims the benefit of priority under 35 U.S.C § 120 of U.S. Provisional Application Ser. No. 63/399,244 filed on Aug. 19, 2022, the content of which is relied upon and incorporated herein by reference in its entirety.

FIELD

The present specification generally relates to sealed glass assemblies and, in particular, to methods of sealing glass assemblies by laser bonding glass to thin metal foil through the foil.

TECHNICAL BACKGROUND

Hermetically bonded glass and metal foil assemblies are increasingly employed in electronics and other devices that may benefit from a hermetic environment. However, conventional laser bonding processes may result in undesirable thermal related defects in regions proximate the bond.

Accordingly, a need exists for alternative methods to produce laser bonded glass and metal foil assemblies while minimizing the thermal defects in regions proximate the bond.

SUMMARY

According to a first aspect A1, a method of sealing a glass assembly comprising a first glass substrate and a second glass substrate may comprise: positioning a first surface of the first glass substrate adjacent to a first surface of the second glass substrate; contacting a second surface of the first glass substrate with a first surface of a first metal foil to create a first contact location between at least a portion of the second surface of the first glass substrate and the first surface of the first metal foil; conducting a first welding step by directing a laser beam on a second surface of the first metal foil opposite the first contact location to bond the first glass substrate to the first metal foil and form a first bond location at the first contact location; rotating the glass assembly 180 degrees about a longitudinal axis of the glass assembly; contacting a second surface of the second glass substrate with a first surface of a second metal foil to create a second contact location between at least a portion of the second surface of the second glass substrate and the first surface of the second metal foil; and conducting a second welding step by directing the laser beam on a second surface of the second metal foil opposite the second contact location to bond the second glass substrate to the second metal foil and form a second bond location at the second contact location, wherein the first metal foil and the second metal foil each have a thickness greater than or equal to 3 μm and less than or equal to 50 μm; and wherein the laser beam comprises a pulsed laser comprising a pulse energy greater than or equal to 2.8 μJ and less than or equal to 1000 μJ and the first metal foil and the second metal foil are substantially opaque to the wavelength of the laser beam.

A second aspect A2 includes the method according to the first aspect A1, and may further include positioning the glass assembly between an optical flat and a platen prior to conducting the first welding step; and compressing the glass assembly between the optical flat and the platen prior to the first welding step, wherein the laser beam is directed through the optical flat and onto the second surface of the first metal foil during the first welding step.

A third aspect A3 includes the method according to the second aspect A2, and may further include positioning the glass assembly between the optical flat and the platen after the rotating the glass assembly 180 degrees about a longitudinal axis of the glass assembly and prior to conducting the second welding step; and compressing the glass assembly between the optical flat and the platen after the rotating the glass assembly 180 degrees about a longitudinal axis of the glass assembly and prior to conducting the second welding step, wherein the laser beam is directed through the optical flat and onto the second surface of the second metal foil during the second welding step.

A fourth aspect A4 includes the method according to the third aspect A3, wherein the compressing the glass assembly comprises applying a compression force to the glass assembly with the platen, wherein the compression force is greater than or equal to 100 kPa and less than or equal to 350 kPa.

A fifth aspect A5 includes the method according to any one of the first through fourth aspects A1-A4, wherein, during the first welding step, an optical path of the laser beam does not pass through a thickness of the first glass substrate or a thickness of the second glass substrate.

A sixth aspect A6 includes the method according to any one of the first through the fifth aspects A1-A5, wherein, during the second welding step, an optical path of the laser beam does not pass through a thickness of the first glass substrate or a thickness of the second glass substrate.

A seventh aspect A7 includes the method according to any one of the first through the sixth aspects A1-A6, and further includes sealing the first metal foil to the second metal foil.

An eighth aspect A8 includes the method according to the seventh aspect A7, wherein sealing the first metal foil to the second metal foil comprises contacting a first surface of the first metal foil with a first surface of the second metal foil to create a third contact location between at least a portion of the first surface of the first metal foil and at least a portion of the first surface of the second metal foil; and conducting a third welding step by directing the laser beam on one of a second surface of the first metal foil opposite the third contact location or a second surface of the second metal foil opposite the third contact location to bond the first metal foil to the second metal foil and form a third bond location at the third contact location.

A ninth aspect A9 includes the method according to any of the first through the eighth aspects A1-A8, wherein: the first metal foil and the second metal foil each comprise a central aperture prior to the first welding step and the second welding step; the first bond location circumscribes the central aperture of the first metal foil; the second bond location circumscribes the central aperture of the second metal foil; and the central aperture of the first metal foil at least partially overlaps with the central aperture of the second metal foil.

A tenth aspect A10 includes the method according to any of the first through the ninth aspects A1-A9, wherein the first glass substrate and the second glass substrate are spaced apart from one another such that a cavity is disposed between the first glass substrate and the second glass substrate.

An eleventh aspect A11 includes the method according to any of the first through the tenth aspects A1-A10, wherein at least one of the first bond location and the second bond location have a maximum bond depth less than or equal to 600 μm.

A twelfth aspect A12, includes the method according to any of the first through the eleventh aspects A1, wherein the first bond location and the second bond location have a bond with greater than or equal to 5 μm and less than or equal to 100 μm.

A thirteenth aspect A13 includes the method according to any of the first through the twelfth aspects A1-A12, wherein the wavelength of the pulsed laser is greater than or equal to 300 nm and less than or equal to 1100 nm.

A fourteenth aspect A14 include the method according to any of the first through the thirteenth aspects A1-A13, wherein the pulsed laser is a nanosecond pulsed laser, a picosecond pulsed laser, or a femtosecond pulsed laser.

A fifteenth aspect A15 includes the method according to any of the first through the fourteenth aspects A1-A14, wherein the pulsed laser has a pulse repetition rate greater than or equal to 5 kHz and less than or equal to 1 MHz.

A sixteenth aspect A16 includes the method according to any of the first through the fifteenth aspects A1-A15, wherein the pulsed laser has a spot size greater than or equal to 5 μm and less than or equal to 100 μm.

A seventeenth aspect A17 includes the method according to any of the first through the sixteenth aspects A1-A16, wherein the first glass substrate and the second glass substrate comprise a refractive index greater than or equal to 1.4 and less than or equal to 2.4.

An eighteenth aspect A18 includes the method according to any of the first through the seventeenth aspects A1-A17, wherein the first glass substrate and the second glass substrate comprise a glass or glass-ceramic comprising borate glass, silicoborate glass, phosphate-based glass, silicon carbide glass, soda-lime silicate glass, aluminosilicate glass, alkali-aluminosilicate glass, borosilicate glass, alkali-borosilicate glass, aluminoborosilicate glass, alkali-aluminoborosilicate glass, or alkali-aluminosilicate glass.

A nineteenth aspect A19 includes the method according to any of the first through the eighteenth aspects A1-A18, wherein at least one of the first metal foil and the second metal foil comprises aluminum, aluminium alloys, stainless steel, nickel, nickel alloys, silver, silver alloys, titanium, titanium alloys, tungsten, tungsten alloys, gold, gold alloys, copper, copper alloys, bronze, iron, or a combination thereof.

A twentieth aspect A20 includes the method according to any of the first through the nineteenth aspects A1-A19, wherein at least one of the first metal foil and the second metal foil comprises a melting point less than or equal to 1800° C.

Additional features and advantages of the laser bonding methods described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

Reference characters indicate corresponding parts throughout the several views. The exemplifications set out herein illustrate at least one embodiment of the present disclosure, and such exemplifications are not to be construed as limiting the scope of the present disclosure in any manner.

DETAILED DESCRIPTION

Figure 1:
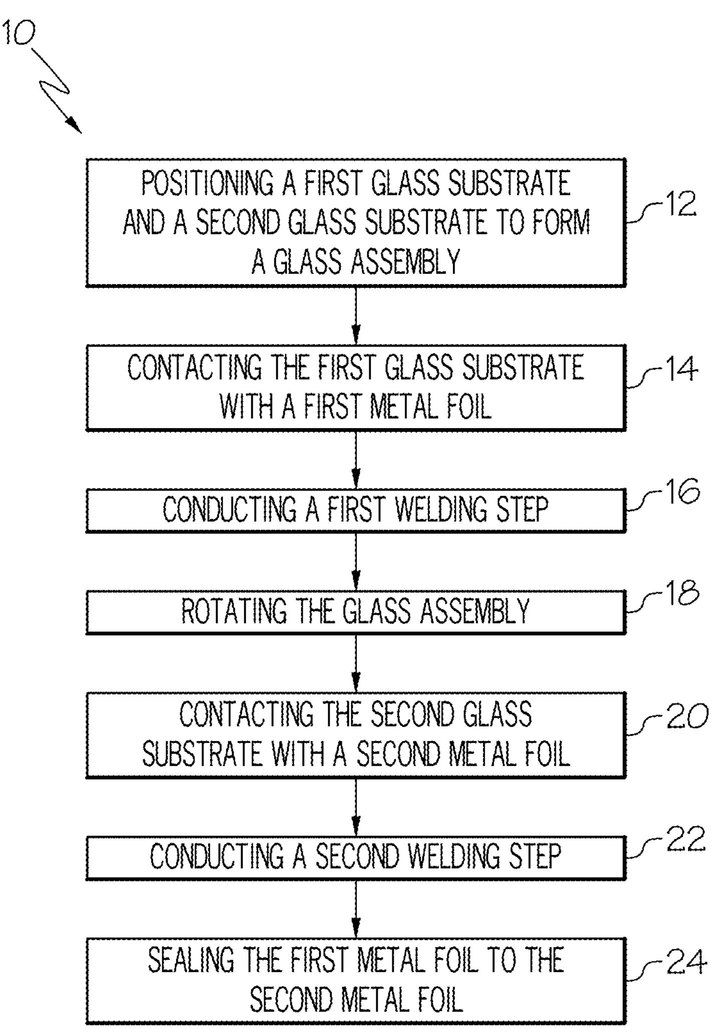
FIG. 1 is a flow diagram of a method of sealing a glass assembly, according to one or more embodiments shown and described herein.

Reference will now be made in detail to various embodiments of methods of sealing glass assemblies by laser bonding glass to metal foil. According to embodiments, a method of sealing a glass assembly comprising a first glass substrate and a second glass substrate includes positioning a first surface of the first glass substrate adjacent to a first surface of the second glass substrate; contacting a second surface of the first glass substrate with a first surface of a first metal foil to create a first contact location between at least a portion of the second surface of the first glass substrate and the first surface of the first metal foil; conducting a first welding step by directing a laser beam on a second surface of the first metal foil opposite the first contact location to bond the first glass substrate to the first metal foil and form a first bond location at the first contact location; rotating the glass assembly 180 degrees about a longitudinal axis of the glass assembly; contacting a second surface of the second glass substrate with a first surface of a second metal foil to create a second contact location between at least a portion of the second surface of the second glass substrate and the first surface of the second metal foil; and conducting a second welding step by directing the laser beam on a second surface of the second metal foil opposite the second contact location to bond the second glass substrate to the second metal foil and form a second bond location at the second contact location. The first metal foil and the second metal foil each have a thickness greater than or equal to 3 μm and less than or equal to 50 μm. The laser beam comprises a pulsed laser comprising a pulse energy greater than or equal to 2.8 μJ and less than or equal to 1000 μJ; and the first metal foil and the second metal foil are substantially opaque to the wavelength of the laser beam. Various embodiments of laser bonding glass to metal foil and the assemblies formed therefrom will be described herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply ab solute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

"Hermetically bonded" or "hermetically sealed," as described herein, refers to a assembly that includes a hermetic seal in accordance with MIL-STD-750E, Test Method 1071.9.

Figure 6:
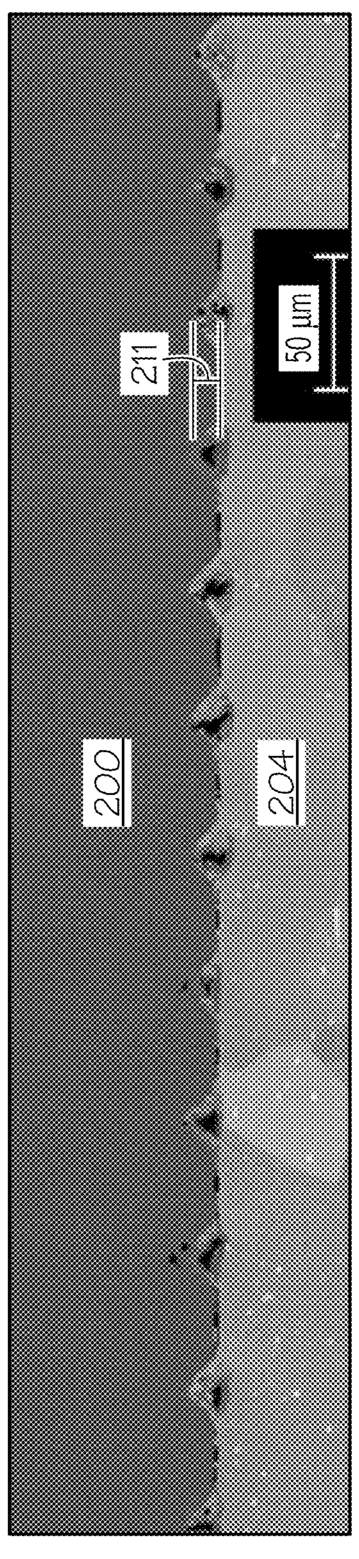
FIG. 6 is a scanning electron microscope image of a cross section of a metal foil bonded to a glass substrate, according to one or more embodiments shown and described herein.

"Maximum bond depth," as described herein and determined using scanning electron microscopy, refers to a depth of the glass substrate/metal foil interface within the glass substrate as shown in FIG. 6.

Hermetically bonded glass and metal foil assemblies may be used in devices which benefit from hermetic packaging, such as televisions, sensors, optical devices, organic light emitting diode (OLED) displays, 3D inkjet printers, liquid lens assemblies, solid-state lighting sources, batteries, and photo-voltaic structures. However, conventional laser bonding processes may be limited by the sensitivity of the optical transmission of the laser beam through the first and second substrates of the glass assembly and through a polymer layer positioned between the two glass substrates. More specifically, the presence of defects within the polymer layer, such as air bubbles and other contamination and defects, can create perturbations or scattering effects on the laser beam by reflecting, deflecting, and/or absorbing laser energy, which may induce variability on the laser bond quality. Additionally, in instances when the defects are not transparent to the wavelength of the laser beam, the defects may be pyrolized or burnt by the laser beam, which may produce heat-affected zones within the polymer layer.

Moreover, in conventional laser sealing processes, once a first bonding location has been formed on the glass assembly, an offset or angled laser beam may be needed to produce a seal at a second bonding location on the glass assembly, which increases the complexity of the bonding process.

Disclosed herein are methods of sealing glass assemblies by laser bonding glass to metal foil which mitigate the aforementioned problems such that the defects and complications described herein are minimized. Specifically, the methods of laser bonding glass to metal foil disclosed herein form bond locations between the metal foil and the first and second glass substrates, respectively, by directing the laser beam on the metal foil, such that the laser beam does not pass through the first and/or second glass substrate. In this manner, interactions between the polymer layer between the glass substrates and the laser beam are avoided and the need to use a laser beam oriented at an oblique angle with respect to the assembly to be sealed is eliminated. Furthermore, the methods of laser bonding glass to metal foil described herein may allow for the use of glass substrates with low optical transmission.

Figure 2:
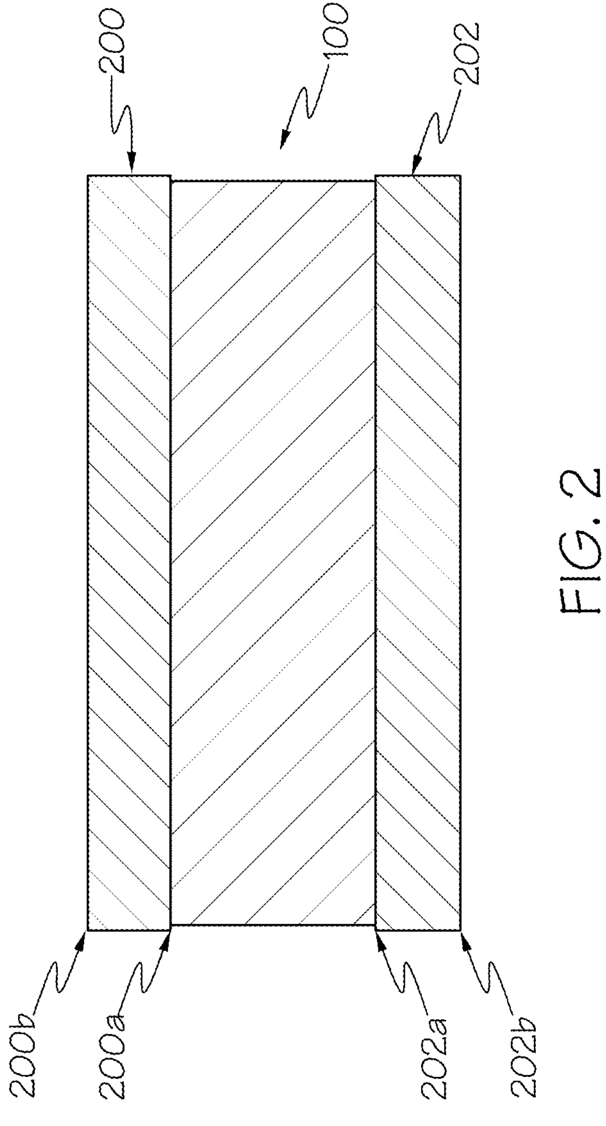
FIG. 2 schematically depicts a step of a method for sealing a glass assembly, according to one or more embodiments shown and described herein.

Referring now to FIGS. 1 and 2, a method 10 of sealing a glass assembly 100 begins at block 12 with positioning a first glass substrate 200 and a second glass substrate 202 to form the glass assembly 100. Each of the first glass substrate 200 and the second glass substrate 202 have a first surface 200*a*, 202*a* and a second surface 200*b*, 202*b* opposite the first surface 200*a*, 202*a*, respectively.

The first surface 200*a* of the first glass substrate 200 is placed adjacent to the first surface 202*a* of the second glass substrate 202. In embodiments, as shown, the first glass substrate 200 and the second glass substrate 202 may not be in direct contact with each other such that one or more other glass substrates, a polymer layer, or components (e.g., electronic components) may be placed therebetween. Positioning the other glass substrates, polymer layer or components between the first glass substrate 200 and the second glass substrate 202 protects the additional substrate(s), polymer layer, or components from environmental conditions, such as pressure changes, moisture, bodily fluids, or the like. In embodiments, the first glass substrate 200 and the second glass substrate 202 may be in direct contact (not shown).

In embodiments, the first and second glass substrates 200, 202 may comprise a refractive index greater than or equal to 1.4 and less than or equal to 2.4. In embodiments, the first and second glass substrates 200, 202 may comprise a refractive index greater than or equal to 1.4, greater than or equal to 1.5, or even greater than or equal to 1.6. In embodiments, the first and second glass substrates 200, 202 may comprise a refractive index less than or equal to 2.4, less than or equal to 2.3, or even less than or equal to 2.2. In embodiments, the first and second glass substrates 200, 202 may comprise a refractive index greater than or equal to 1.4 and less than or equal to 2.4, greater than or equal to 1.4 and less than or equal to 2.3, greater than or equal to 1.4 and less than or equal to 2.2, greater than or equal to 1.5 and less than or equal to 2.4, greater than or equal to 1.5 and less than or equal to 2.3, greater than or equal to 1.5 and less than or equal to 2.2, greater than or equal to 1.6 and less than or equal to 2.4, greater than or equal to 1.6 and less than or equal to 2.3, or even greater than or equal to 1.6 and less than or equal to 2.2, or any and all sub-ranges formed from any of these endpoints. It should be understood that, in some embodiments, the first and second glass substrates 200, 202 may have refractive index values which are different from one another.

In embodiments, the first and second glass substrates 200, 202 may comprise a glass or a glass-ceramic. By way of non-limiting examples, the first and second glass substrates 200, 202 may comprise borate glass, silicoborate glass, phosphate-based glass, silicon carbide glass, soda-lime silicate glass, aluminosilicate glass, alkali-aluminosilicate glass, borosilicate glass, alkali-borosilicate glass, alumino-borosilicate glass, alkali-alumino-borosilicate glass, or alkali-aluminosilicate glass. In embodiments in which a relatively high refractive index glass (e.g., refractive index greater than or equal to 1.4 and less than or equal to 2.4) is desired, the first and second glass substrates 200, 202 may comprise borate glass, or silicoborate glass. In embodiments, the first and second glass substrates 200, 202 may be chemically strengthened, chemically tempered, and/or thermally tempered. Non-limiting examples of suitable commercially available glass substrates include EAGLE XG®, Lotus™, Willow®, and Gorilla® glasses from Corning Incorporated, including chemically strengthened, chemically tempered, and/or thermally tempered versions thereof. In embodiments, glasses and glass-ceramics that have been chemically strengthened by ion exchange may be suitable as substrates. In other embodiments, the first and/or second glass substrates 200, 202 may be a strengthened glass-to-glass laminate.

In embodiments, the first and second glass substrates 200, 202 may comprise a coating thereon (not shown). In embodiments, the coating may comprise a similar refractive index as the first and second glass substrates 200, 202. In embodiments, the coating may comprise a polymer coating, an antireflection (AR) coating, an oliphobic coating, an anti-glare coating, or a scratch resistant coating.

In embodiments, the first and second glass substrates 200, 202 may be formed from a material that is substantially transparent to a selected wavelength of the laser beam used to bond the metal foil to the glass. The term "substantially transparent" means that the selected wavelength of the laser beam transmits through the material without being substantially absorbed or scattered. For example, in embodiments, a material that is substantially transparent to a selected wavelength of the laser beam may be a material that exhibits a transmittance greater or equal to 90% at the selected wavelength. In embodiments, the first and second glass substrates 200, 202 may optionally be substantially transparent to a wavelength of light greater than or equal to 300 nm and less than or equal to 1100 nm or even greater than or equal to 330 nm and less than or equal to 750 nm.

In embodiments, the first and second glass substrates 200, 202 may be subjected to surface preparation prior to bonding of the glass substrates to a metal foil. For example, in embodiments, the first and second glass substrates 200, 202 may be polished until the surfaces thereof exhibit comparatively lower surface roughness values, which may enhance bonding to the metal foil. In embodiments, the first surface and/or the second surface 200*a*, 200*b*, 202*a*, 202*b* of the first and second glass substrates 200, 202 may be polished until the first surface and/or second surface 200*a*, 200*b*, 202*a*, 202*b* exhibit an average surface roughness (Ra) less than or equal to 1 μm, less than or equal to 0.5 μm, or even less than or equal to 0.25 μm. The smooth surface may allow the first and second glass substrates 200, 202 to be placed in close contact with a metal foil (e.g., within a few μm of one another). In addition, the first and second glass substrates 200, 202 may be cleaned with water and/or solvents to remove any debris present on the surface and/or to remove any material (oil, grease, etc.). Removal of any debris may allow the first and second glass substrates 200, 202 to be placed in close contact with the metal foil to better facilitate laser bonding of the metal foil to the glass.

Figure 3:
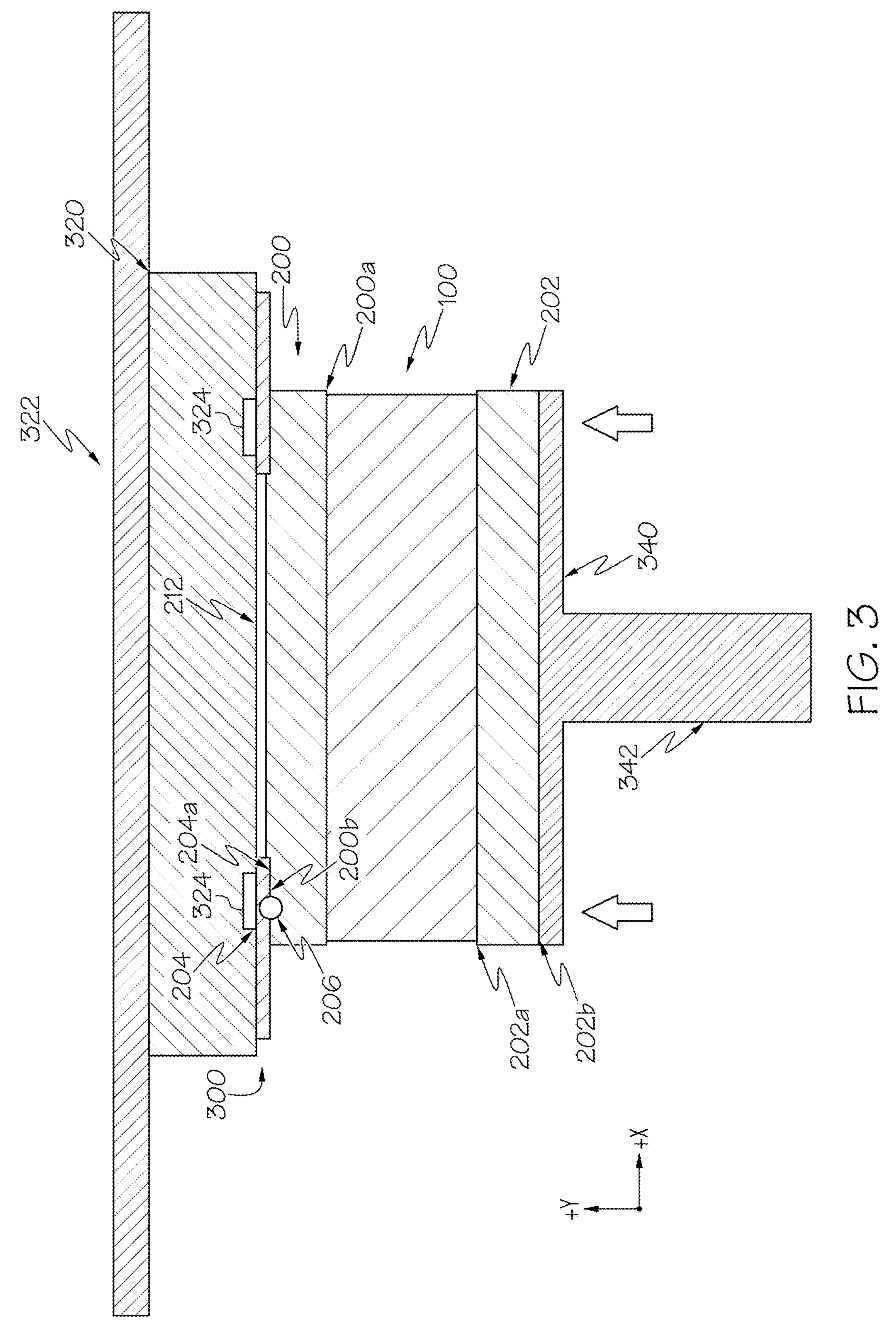
FIG. 3 schematically depicts another step of a method for sealing the glass assembly, according to one or more embodiments shown and described herein.

Referring now to FIGS. 1 and 3, the glass assembly 100 may be optionally inserted into a fixture 300 comprising an optical flat 320 and a platen 340. The platen 340 may be positioned on a piston 342 which may be used to actuate the platen 340 in a vertical direction (+y direction as shown by the coordinate axis of FIG. 3). The optical flat 320 may be fixed in place in the vertical direction by a security plate 322. As the piston 342 actuates the platen 340 in the vertical direction, the glass assembly 100 may be similarly moved in the vertical direction towards the optical flat 320. In these embodiments, the optical flat 320 may further include a cavity 324, such as an air cavity, which may be coupled to a pressure gauge, such as an air pressure gauge, by way of a canal. As the piston 342 actuates the platen 340 in the vertical direction, the pressure gauge may be activated, such that air is directed onto the glass assembly 100.

Once the glass assembly 100 contacts the optical flat 320, the security plate 322 may act to hold the optical flat 320 in position and counteract the actuation force of the piston 342, such that the glass assembly 100 becomes compressed between the platen 340 and the optical flat 320. In these embodiments, the glass assembly 100 may be positioned in the fixture 300 between the optical flat 320 and the platen 340 such that the second surface 200*b* of the first glass substrate 200 is adjacent the optical flat 320 and the second surface 202*b* of the second glass substrate 202 is adjacent the platen 340.

With the glass assembly 100 positioned within the fixture 300, the second surface 200*b* of the first glass substrate 200 is contacted with a first surface 204*a* of a first metal foil 204 to create a first contact location 206 between at least a portion of the second surface 200*b* of the first glass substrate 200 and the first surface 204*a* of the first metal foil 204 as shown at block 14. The first metal foil 204 may further include a first central aperture 212, such as a clear aperture, which may be centrally positioned on the first metal foil 204, thereby exposing the second surface 200*b* of the first glass substrate 200 in the first central aperture 212.

In embodiments, the first metal foil 204 may have a thickness less than or equal to 50 μm. In embodiments, the first metal foil 204 may have a thickness greater than or equal to 3 μm and less than or equal to 50 μm. In embodiments, the first metal foil 204 may have a thickness greater than or equal to 5 μm, greater than or equal to 10 μm, or even greater than or equal to 20 μm. In embodiments, the first metal foil 204 may have a thickness less than or equal to 50 μm, less than or equal to 40 μm, or even less than or equal to 30 μm. In embodiments, the first metal foil 204 may have a thickness greater than or equal to 3 μm and less than or equal to 50 μm, greater than or equal to 5 μm and less than or equal to 40 μm, greater than or equal to 5 μm and less than or equal to 30 μm, greater than or equal to 10 μm and less than or equal to 50 μm, greater than or equal to 10 μm and less than or equal to 40 μm, greater than or equal to 10 μm and less than or equal to 30 μm, greater than or equal to 20 μm and less than or equal to 50 μm, greater than or equal to 20 μm and less than or equal to 40 μm, or even greater than or equal to 20 μm and less than or equal to 30 μm, or any and all sub-ranges formed from any of these endpoints.

In embodiments, the first metal foil 204 may comprise aluminum, aluminum alloys, stainless steel, nickel, nickel alloys, silver, silver alloys, titanium, titanium alloys, tungsten, tungsten alloys, gold, gold alloys, copper, copper alloys, bronze, iron, or a combination thereof. In embodiments, the first metal foil 204 may comprise a metal in combination with another non-metal material.

In embodiments, the first metal foil 204 may be formed from a material that has a melting point that allows for successful bonding to the glass substrate. In embodiments, the first metal foil 204 may comprise a melting point less than or equal to 1800° C., less than or equal to 1700° C., or even less than or equal to 1600° C.

In embodiments, the first metal foil 204 may be formed from a material that is substantially opaque to a selected wavelength of a laser beam. The term "substantially opaque" means that the selected wavelength of the laser beam is substantially absorbed when the laser beam 208 contacts the material rather than transmitted through the material. For example, in embodiments, a material that is substantially opaque to the selected wavelength of the laser beam may be a material that exhibits an absorbance greater than or equal to 35% at the wavelength.

In embodiments, the first metal foil 204 may have the same or a similar average surface roughness (Ra) as the first glass substrate 200 to similarly allow the first glass substrate 200 to be placed in close contact with the first metal foil 204.

Figure 4:
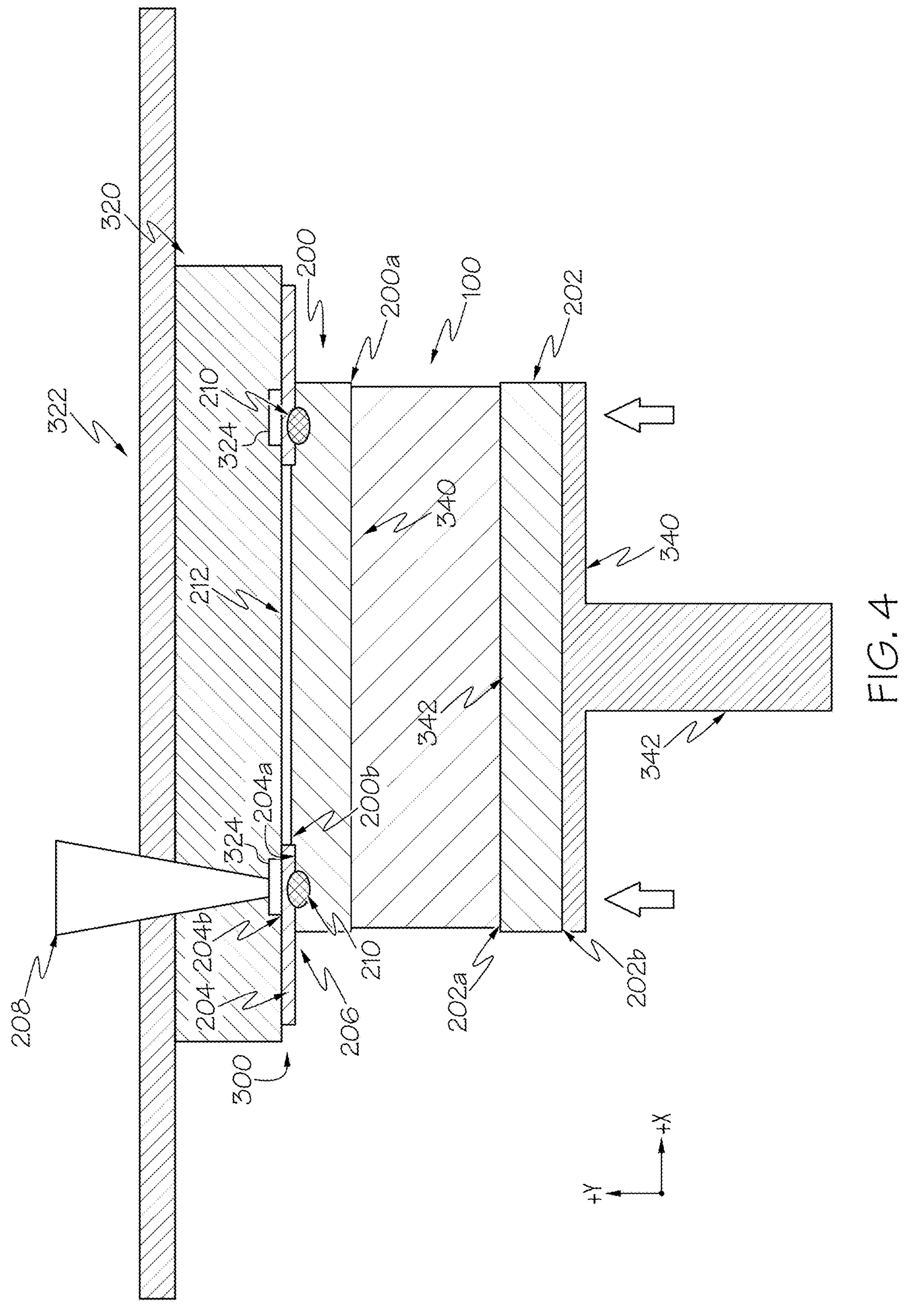
FIG. 4 schematically depicts another step of a method for sealing the glass assembly, according to one or more embodiments shown and described herein.

Referring now to FIG. 1 and as shown in FIG. 4, at block 16, a first welding step is conducted. In some embodiments, the glass assembly 100 may be optionally compressed between the optical flat 320 and the platen 340 prior to conducting the first welding step. In these embodiments, the piston 342 may drive the platen 340 in the vertical direction, such that the platen 340 may contact the second surface 202*b* of the second glass substrate 202 to apply a compression force (+y direction as shown by the coordinate axis of FIG. 4) on the glass assembly 100. As the platen 340 forces the second glass substrate 202 to move in the vertical direction, the second glass substrate 202 may similarly cause the first glass substrate 200 to move in the vertical direction towards the optical flat 320. When the second surface 200*b* of the first glass substrate 200 contacts the optical flat 320, the security plate 322 may secure the optical flat 320 in position, such that the compression force is applied on the glass assembly 100 as the piston 342 continues to drive the platen 340 in the vertical direction. As the compression force is applied by the platen 340 to the second glass substrate 202, the first glass substrate 200 and the first metal foil 204 may become compressed against the optical flat 320 to ensure that the first contact location 206 between the second surface 200*b* of the first glass substrate 200 and the first surface 204*a* of the first metal foil 204 is maintained. In these embodiments, the compression force applied to the glass assembly 100 with the platen 340 may be greater than or equal to 100 kPa and less than or equal to 350 kPa.

In some embodiments, the first contact location 206 between the second surface 200*b* of the first glass substrate 200 and the first surface 204*a* of the first metal foil 204 may be aligned with the cavity 324 of the optical flat 320. In these embodiments, the pressure gauge may apply air through the cavity 324 and onto the second surface 204*b* of the first metal foil 204 in order to further ensure that first contact location 206 is maintained.

With the glass assembly 100 optionally compressed between the optical flat 320 and the platen 340, the first welding step may be conducted by directing a laser beam 208 through the cavity 324 of the optical flat 320 and onto a second surface 204*b* of the first metal foil 204 opposite the first contact location 206 to bond the first glass substrate 200 to the first metal foil 204 and form a first bond location 210 at the first contact location 206 on at least a portion of the first contact location 206 to bond the first glass substrate 200 and the first metal foil 204. By directing the laser beam 208 through the cavity 324 of the optical flat 320 to form the first bond location 210, it may be possible to ensure that none of the first metal foil 204 adheres to the optical flat 320 during the first welding step. In these embodiments, an optical path of the laser beam 208 does not pass through a thickness of the first glass substrate 200 or the second glass substrate 202 during the first welding step. The first bond location 210 may further circumscribe the first central aperture 212 of the first metal foil 204, such as when the laser beam 208 is traversed around the first central aperture 212 during the first welding step.

Although FIGS. 3 and 4 illustrate the glass assembly 100 being compressed within the fixture 300 during the first welding step, it should be understood that, in some embodiments, contact between the first metal foil 204 and the first glass substrate 200 may be achieved without the use of the fixture 300. For example, when the thickness of the first metal foil 204 is sufficiently small, an electromagnetic force may act between the first metal foil 204 and the first glass substrate 200 to secure the first metal foil 204 to the first glass substrate 200. In these embodiments, the electromagnetic force may hold the first metal foil 204 and the first glass substrate 200 together, such that the first welding step may be conducted by directing a laser beam 208 through the second surface 204*b* of the first metal foil 204 and onto the first glass substrate 200.

In any of the embodiments described herein, the laser beam 208 comprises a pulsed laser. In embodiments, the pulsed laser may be a nanosecond pulsed laser, a picosecond pulsed laser, or a femtosecond pulsed laser.

The method 10 of laser bonding described herein utilizes lower energy lasers to bond the metal foil to the glass, thereby minimizing related thermal defects in regions proximate to the bond. In embodiments, the pulsed laser may comprise a pulse energy greater than or equal to 2.8 μJ and less than or equal to 1000 μJ. In embodiments, the pulsed laser may comprise a pulse energy greater than or equal to 2.8 μJ, greater than or equal to 10 μJ, greater than or equal to 25 μJ, or even greater than or equal to 50 μJ. In embodiments, the pulsed laser may comprise a pulse energy of less than or equal to 1000 μJ, less than or equal to 750 μJ, less than or equal to 500 μJ, or even less than or equal to 250 μJ. In embodiments, the pulsed laser may comprise a pulse energy greater than or equal to 2.8 μJ and less than or equal to 1000 μJ, greater than or equal to 2.8 μJ and less than or equal to 750 μJ, greater than or equal to 2.8 μJ and less than or equal to 500 μJ, greater than or equal to 2.8 μJ and less than or equal to 250 μJ, greater than or equal to 10 μJ and less than or equal to 1000 μJ, greater than or equal to 10 μJ and less than or equal to 750 μJ, greater than or equal to 10 μJ and less than or equal to 500 μJ, greater than or equal to 10 μJ and less than or equal to 250 μJ, greater than or equal to 25 μJ and less than or equal to 1000 μJ, greater than or equal to 25 μJ and less than or equal to 750 μJ, greater than or equal to 25 μJ and less than or equal to 500 μJ, greater than or equal to 25 μJ and less than or equal to 250 μJ, greater than or equal to 50 μJ and less than or equal to 1000 μJ, greater than or equal to 50 μJ and less than or equal to 750 μJ, greater than or equal to 50 μJ and less than or equal to 500 μJ, or even greater than or equal to 50 μJ and less than or equal to 250 μJ, or any and all sub-ranges formed from any of these endpoints.

In embodiments, the pulsed laser may optionally have a wavelength such that the first glass and/or second glass substrates 200, 202 are substantially transparent to the wavelength of the laser beam 208 and the first metal foil 204 is substantially opaque to the wavelength of the laser beam 208. For example, in embodiments the pulsed laser may have a wavelength greater than or equal to 300 nm and less than or equal to 1100 nm. In embodiments, the pulsed laser may have a wavelength greater than or equal to 300 nm, greater than or equal to 325 nm, or even greater than or equal to 350 nm. In embodiments, the pulsed laser may have a wavelength less than or equal to 1100 nm, less than or equal to 900 nm, or even less than or equal to 700 nm. In embodiments, the pulsed laser may have a wavelength greater than or equal to 300 nm and less than or equal to 1100 nm, greater than or equal to 300 nm and less than or equal to 900 nm, greater than or equal to 300 nm and less than or equal to 700 nm, greater than or equal to 325 nm and less than or equal to 1100 nm, greater than or equal to 325 nm and less than or equal to 900 nm, greater than or equal to 325 nm and less than or equal to 700 nm, greater than or equal to 350 nm and less than or equal to 1100 nm, greater than or equal to 350 nm and less than or equal to 900 nm, or even greater than or equal to 350 nm and less than or equal to 700 nm, or any and all sub-ranges formed from any of these endpoints.

In embodiments, the pulsed laser may comprise a high-repetition pulsed ultraviolet ("UV") laser operating at about 355 nm, 532 nm, 1064 nm or any other wavelength that is suitable, depending on the absorption characteristics of the foil and/or the glass.

In embodiments, the pulsed laser may have a pulse repetition rate greater than or equal to 5 kHz and less than or equal to 1 MHz. In embodiments, the pulsed laser may have a pulse repetition rate greater than or equal to 5 kHz, greater than or equal to 50 kHz, greater than or equal to 100 kHz, or even greater than or equal to 250 kHz. In embodiments, the pulsed laser may have a pulse repetition rate less than or equal to 1 MHz, less than or equal to 750 kHz, or even less than or equal to 500 KHz. In embodiments, the pulsed laser may have a pulse repetition rate greater than or equal to 5 kHz and less than or equal to 1 MHz, greater than or equal to 5 kHz and less than or equal to 750 kHz, greater than or equal to 5 kHz and less than or equal to 500 kHz, greater than or equal to 50 kHz and less than or equal to 1 MHz, greater than or equal to 50 kHz and less than or equal to 750 kHz, greater than or equal to 50 kHz and less than or equal to 500 kHz, greater than or equal to 100 kHz and less than or equal to 1 MHz, greater than or equal to 100 kHz and less than or equal to 750 kHz, greater than or equal to 100 kHz and less than or equal to 500 kHz, greater than or equal to 250 kHz and less than or equal to 1 MHz, greater than or equal to 250 kHz and less than or equal to 750 kHz, or even greater than or equal to 250 kHz and less than or equal to 500 kHz, or any and all sub-ranges formed from any of these endpoints.

In embodiments, the pulsed laser may have a spot size greater than or equal to 5 μm and less than or equal to 100 μm. In embodiments, the pulsed laser may have a spot size greater than or equal to 5 μm or even greater than or equal to 10 μm. In embodiments, the pulsed laser may have a spot size less than or equal to 50 μm, less than or equal to 35 μm, or even less than or equal to 20 μm. In embodiments, the pulsed laser may have a spot size greater than or equal to 5 μm and less than or equal to 50 μm, greater than or equal to 5 μm and less than or equal to 35 μm, greater than or equal to 5 μm and less than or equal to 20 μm, greater than or equal to 10 μm and less than or equal to 50 μm, greater than or equal to 10 μm and less than or equal to 35 μm, or even greater than or equal to 10 μm and less than or equal to 20 μm, or any and all sub-ranges formed from any of these endpoints.

Figure 5:
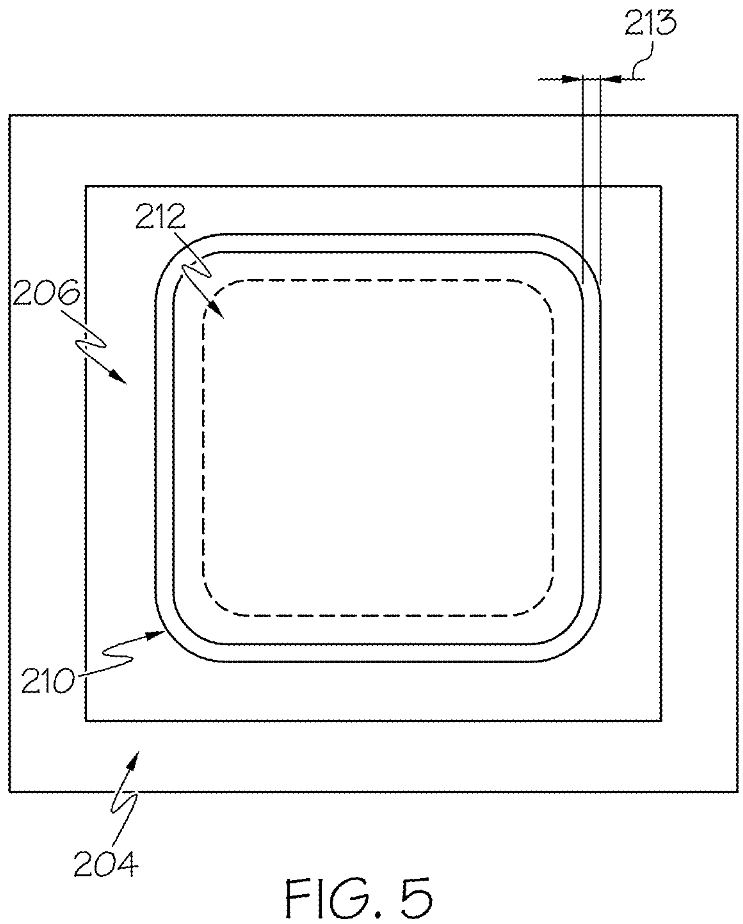
FIG. 5 schematically depicts a top view of a line bond between a first glass substrate and a first metal foil, according to one or more embodiments shown and described herein.

In embodiments, as shown in FIG. 5, during the first welding step, the laser beam may be traversed along the first contact location 206 to facilitate a line bond between the glass and foil. For example, the laser beam may be traversed along the first contact location 206 to facilitate a line bond between the glass and foil. In these embodiments, the first bond location 210 may have a bond width 213 greater than or equal to 5 μm and less than or equal to 100 μm. Furthermore, the laser beam may circumscribe the first central aperture 212 of the first metal foil 204, such that the line bond between the glass and the foil circumscribes the first central aperture 212 and the width of the line bond is equal to the width of the first bond location 210.

As described herein, the methods of laser bonding glass to metal foil disclosed herein utilize lower energy lasers to minimize related thermal defects in regions proximate the bond by reducing maximum bond depth 211. The maximum bond depth 211 may refer to the distance in which the metal foil penetrates the glass substrate during the welding step. In these embodiments, a reduced maximum bond depth 211 of less than or equal to 600 μm may be achieved, as is illustrated in FIG. 6. In other embodiments, the maximum bond depth 211 may be less than or equal to 10 μm.

By minimizing the maximum bond depth 211, laser defects within the bond location may be minimized. Additionally, minimizing the maximum bond depth 211 may minimize the amount of material required to achieve the desired bond between the metal foil and the glass substrate, while also increasing the adaptability of the assembly. In the embodiment depicted in FIG. 6, the first bond location 210 may have a bond depth less than or equal to the maximum bond depth.

Figure 7:
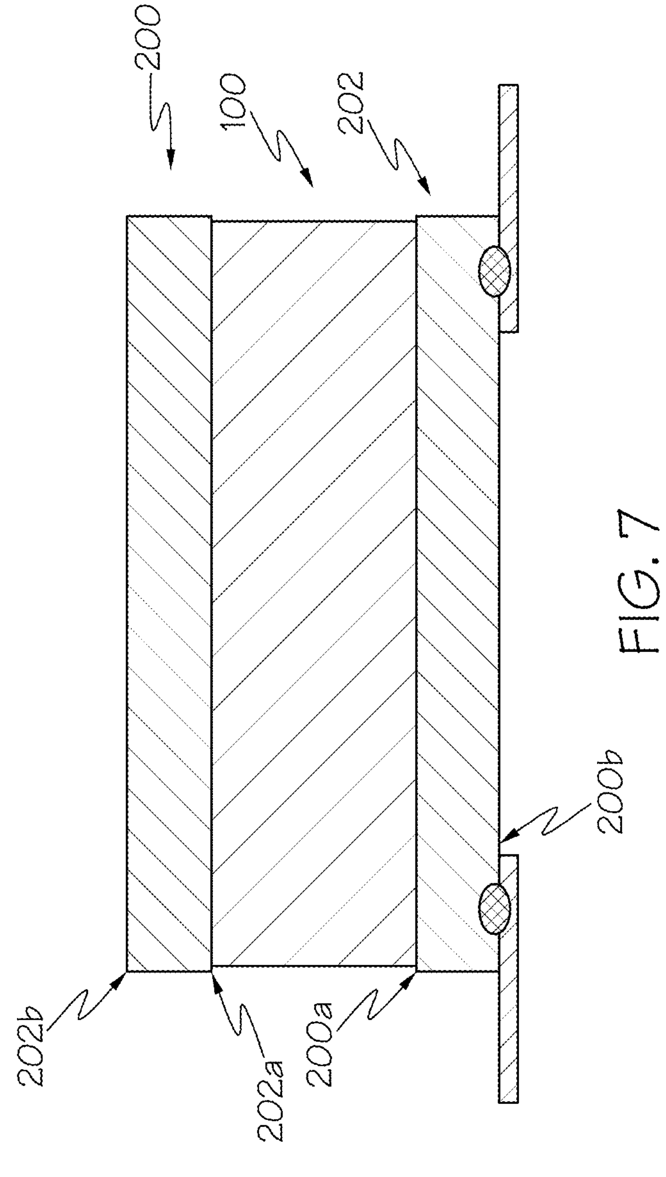
FIG. 7 schematically depicts another step of a method for sealing the glass assembly, according to one or more embodiments shown and described herein.

Referring again to FIG. 1 and as shown in FIG. 7, at block 18, the glass assembly 100 is removed from the fixture and rotated 180 degrees about a longitudinal axis L of the glass assembly 100. Once the glass assembly 100 is rotated 180 degrees about the longitudinal axis L, the relative positions of the first glass substrate 200 and the second glass substrate 202 are flipped, such that the first glass substrate 200 is positioned below the second glass substrate 202.

Figure 8:
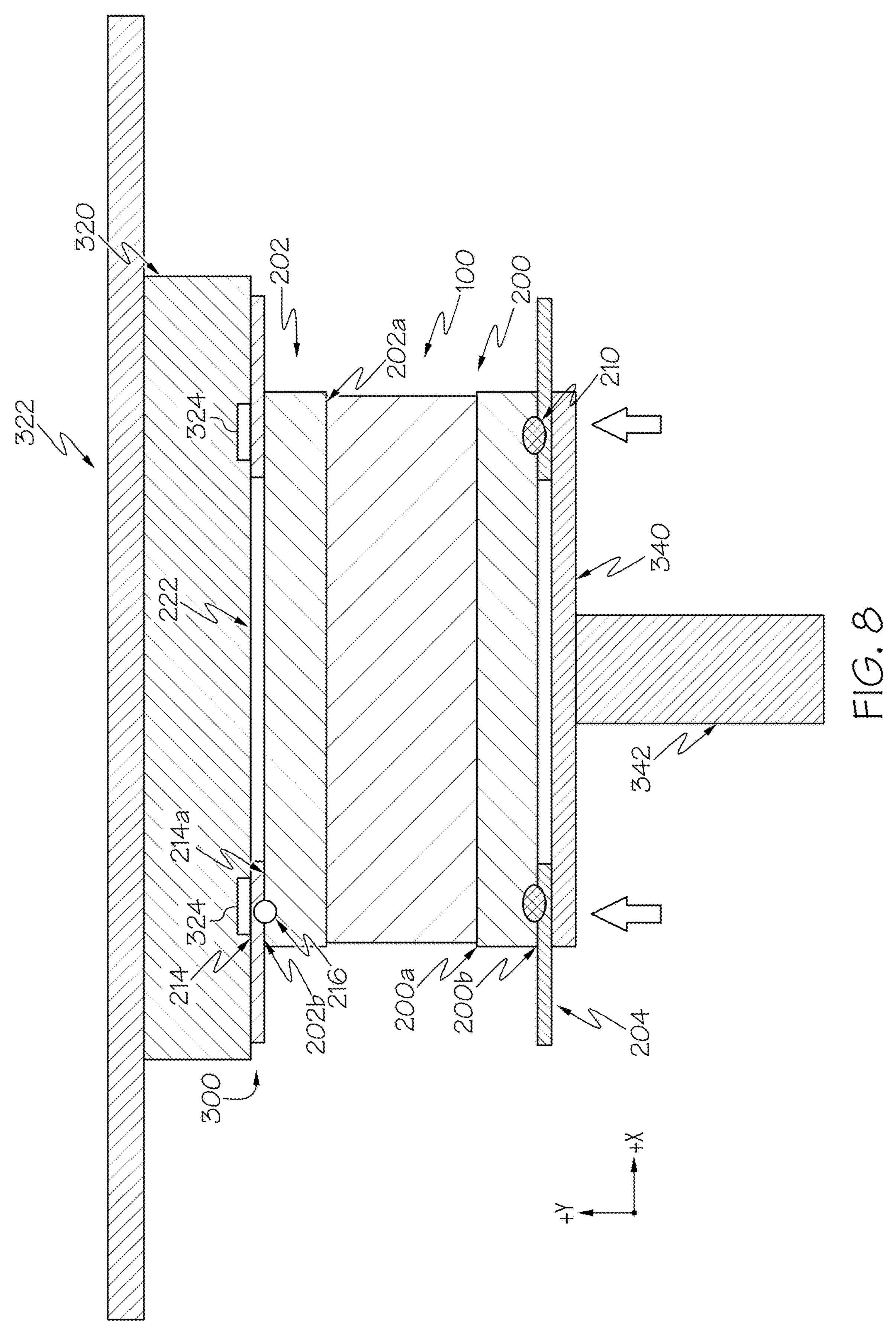
FIG. 8 schematically depicts another step of a method for sealing the glass assembly, according to one or more embodiments shown and described herein.

Referring now to FIG. 1 and as shown in FIG. 8, the glass assembly 100 may be optionally reinserted into the fixture 300. The glass assembly 100 may be optionally positioned in the fixture 300 between the optical flat 320 and the platen 340 such that the second surface 202*b* of the second glass substrate 202 is adjacent the optical flat 320 and the second surface 200*b* of the first glass substrate 200 is adjacent the platen 340.

Referring still to FIGS. 1 and 8, and as shown at block 20, the second surface 202*b* of the second glass substrate 202 is then contacted with a first surface 214*a* of a second metal foil 214 to create a second contact location 216 between at least a portion of the second surface 202*b* of the second glass substrate 202 and the first surface 214*a* of the second metal foil 214. The second metal foil 214 may further include a second central aperture 222, such as a clear aperture, which may be centrally positioned on the second metal foil 214, thereby exposing the second surface 202*b* of the second glass substrate 202 in the second central aperture 222. In embodiments, the second metal foil 214 may have substantially similar or the same properties as the first metal foil 204 as described hereinabove with respect to FIG. 3.

Figure 9:
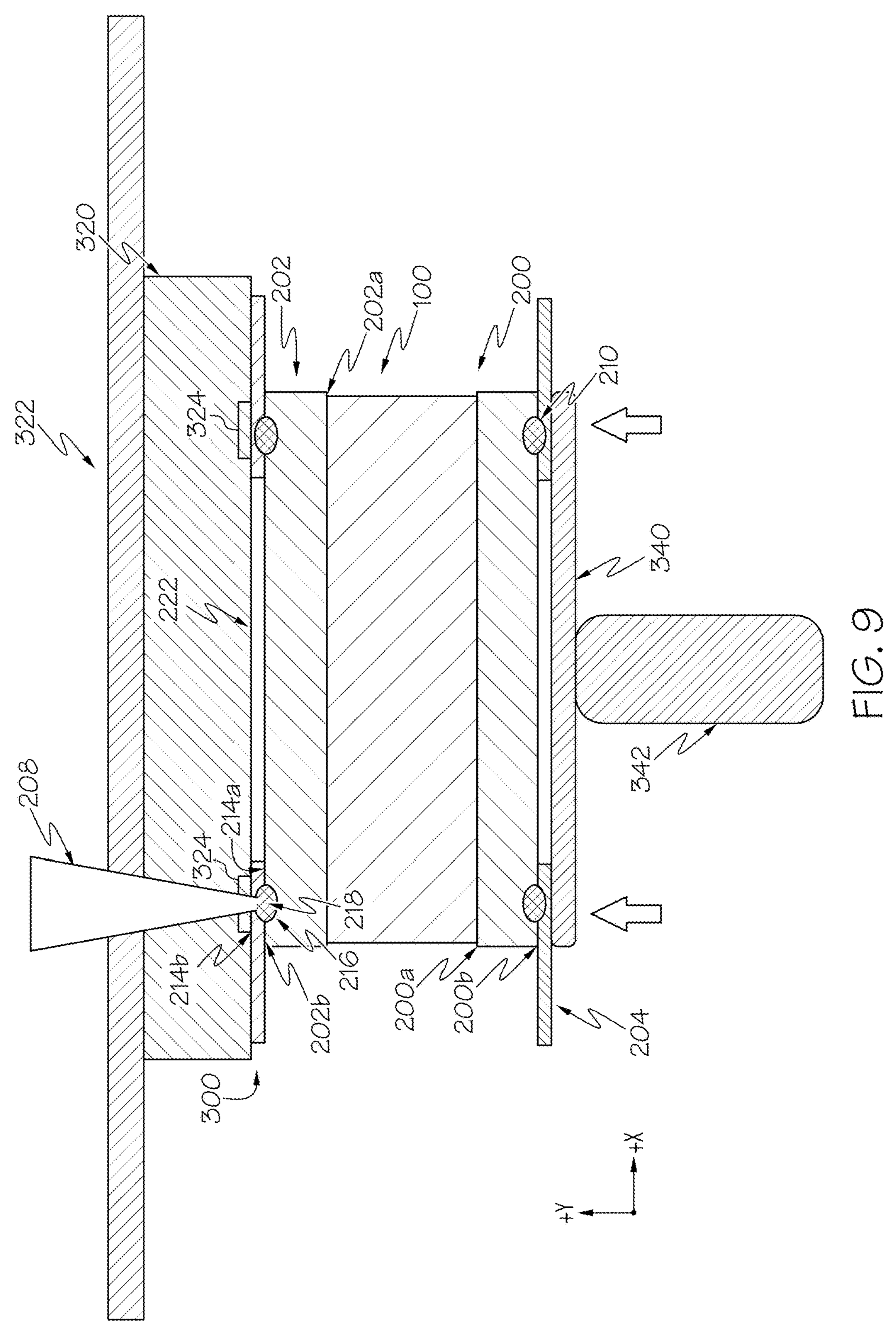
FIG. 9 schematically depicts another step of a method for sealing the glass assembly, according to one or more embodiments shown and described herein.

Referring back to FIG. 1 and as also shown in FIG. 9, at block 22, a second welding step is conducted. In some embodiments, the glass assembly 100 may be optionally compressed between the optical flat 320 and the platen 340 prior to conducting the second welding step. In these embodiments, the piston 342 may drive the platen 340 in the vertical direction, such that the platen 340 may contact the second surface 200*b* of the first glass substrate 200 to apply a compression force (+y direction as shown by the coordinate axis of FIG. 9) on the glass assembly 100. As the platen 340 forces the first glass substrate 200 to move in the vertical direction, the first glass substrate 200 may similarly act to move the second glass substrate 202 in the vertical direction towards the optical flat 320. When the second surface 202*b* of the second glass substrate 202 contacts the optical flat 320, the security plate 322 may secure the optical flat in position, such that the compression force is applied on the glass assembly 100 as the piston 342 continues to drive the platen 340 in the vertical direction. It should be understood that, because the first metal foil 204 has been bonded to the second surface 200*b* of the first glass substrate 200, the compression force may also be applied on the first metal foil 204.

As the compression force is applied by the platen 340 on the first glass substrate 200, the second glass substrate 202 and the second metal foil 214 may become compressed against the optical flat 320 to ensure that the second contact location 216 between the second surface 202*b* of the second glass substrate 202 and the first surface 214*a* of the second metal foil 214 is maintained. In these embodiments, the compression force applied to the glass assembly 100 with the platen 340 may be greater than or equal to 100 kPa and less than or equal to 350 kPa.

In some embodiments, the second contact location 216 between the second surface 202*b* of the second glass substrate 202 and the first surface 214*a* of the second metal foil 214 may be aligned with the cavity 324 of the optical flat 320. In these embodiments, the pressure gauge may apply air through the cavity 324 and onto the second surface 214*b* of the second metal foil 214 in order to further ensure that second contact location 216 is maintained.

With the glass assembly 100 optionally compressed within the fixture 300, the second welding step may be conducted by directing the laser beam 208 through the cavity 324 of the optical flat 320 and onto a second surface 214*b* of the second metal foil 214 opposite the second contact location 216 to bond the second glass substrate 202 to the second metal foil 214 and form a second bond location 218 at the second contact location 216. By directing the laser beam 208 through the cavity 324 of the optical flat 320 to form second bond location 218, it may be possible to ensure that none of the second metal foil 214 adheres to the optical flat 320 during the second welding step. In these embodiments, an optical path of the laser beam 208 does not pass through a thickness of the first glass substrate 200 or the second glass substrate 202 during the second welding step. The second bond location 218 may further circumscribe the second central aperture 222 of the second metal foil 214, such as when the laser beam is traversed around the second central aperture 222 during the second welding step.

Although FIGS. 8 and 9 illustrate the glass assembly 100 being compressed within the fixture 300 during the second welding step, it should be understood that, in some embodiments, contact between the second metal foil 214 and the second glass substrate 202 may be achieved without the use of the fixture 300. For example, when the thickness of the second metal foil 214 is sufficiently small, an electromagnetic force may act between the second metal foil 214 and the second glass substrate 202 to secure the second metal foil 214 to the second glass substrate 202. In these embodiments, the electromagnetic force may hold the second metal foil 214 and the second glass substrate 202 together, such that the second welding step may be conducted by directing a laser beam 208 through the second surface 214*b* of the second metal foil 214 and onto the second glass substrate 202.

Figure 10:
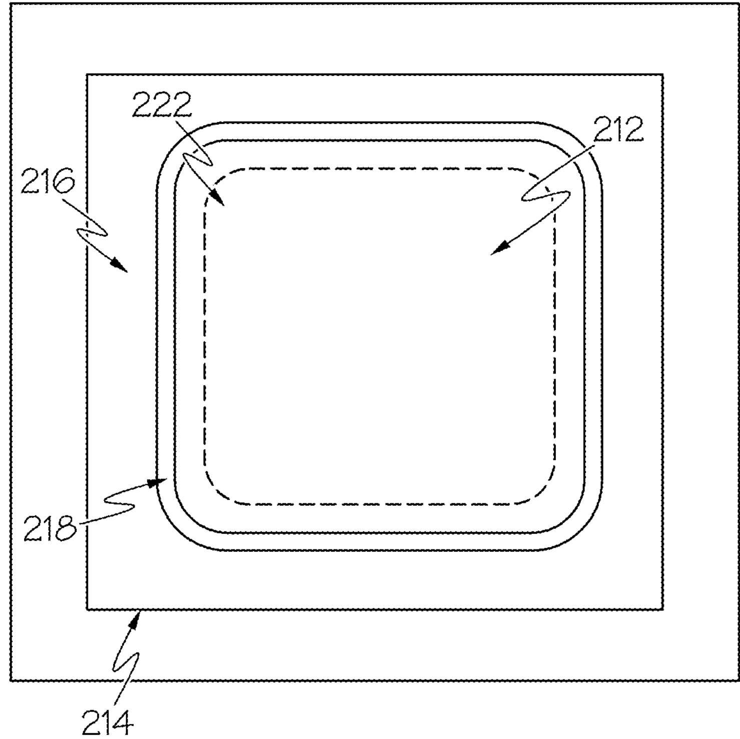
FIG. 10 schematically depicts a top view of a line bond between a second glass substrate and a second metal foil, according to one or more embodiments shown and described herein.

During the second welding step, the laser beam 208 may be traversed along the second contact location 216 to facilitate a line bond between the glass and foil, as is most clearly depicted in FIG. 10. Furthermore, the laser beam 208 may circumscribe the second central aperture 222 of the second metal foil 214, such that the line bond between the glass and the foil circumscribes the second central aperture 222 and the width of the line bond is equal to the width of the second bond location 218.

In embodiments, the second welding step may utilize substantially similar or the same laser beam 208 properties of laser beam 208 as the first welding step as described hereinabove with respect to FIG. 4.

In embodiments, the second bond location 218 may have a reduced maximum bond depth 211 substantially similar or the same as the first bond location 210 as described hereinabove with respect to FIGS. 4 and 6.

In the embodiments described herein and with reference to FIGS. 1, 5, and 10, the first metal foil 204 and the second metal foil 214 may be bonded to the first glass substrate 200 and second glass substrate 202, respectively, such that the first central aperture 212 of the first metal foil 204 at least partially overlaps with the second central aperture 222 of the second metal foil 214, thereby exposing the first and second glass substrates 200, 202 through the first central aperture 212 and the second central aperture 222 and providing a window through the glass assembly 100. In other embodiments, such as the embodiment illustrated in FIG. 10, the first central aperture 212 of the first metal foil 204 may be aligned with the second central aperture 222 of the second metal foil 214, such that the first central aperture 212 and the second central aperture 222 completely overlap.

Figure 11:
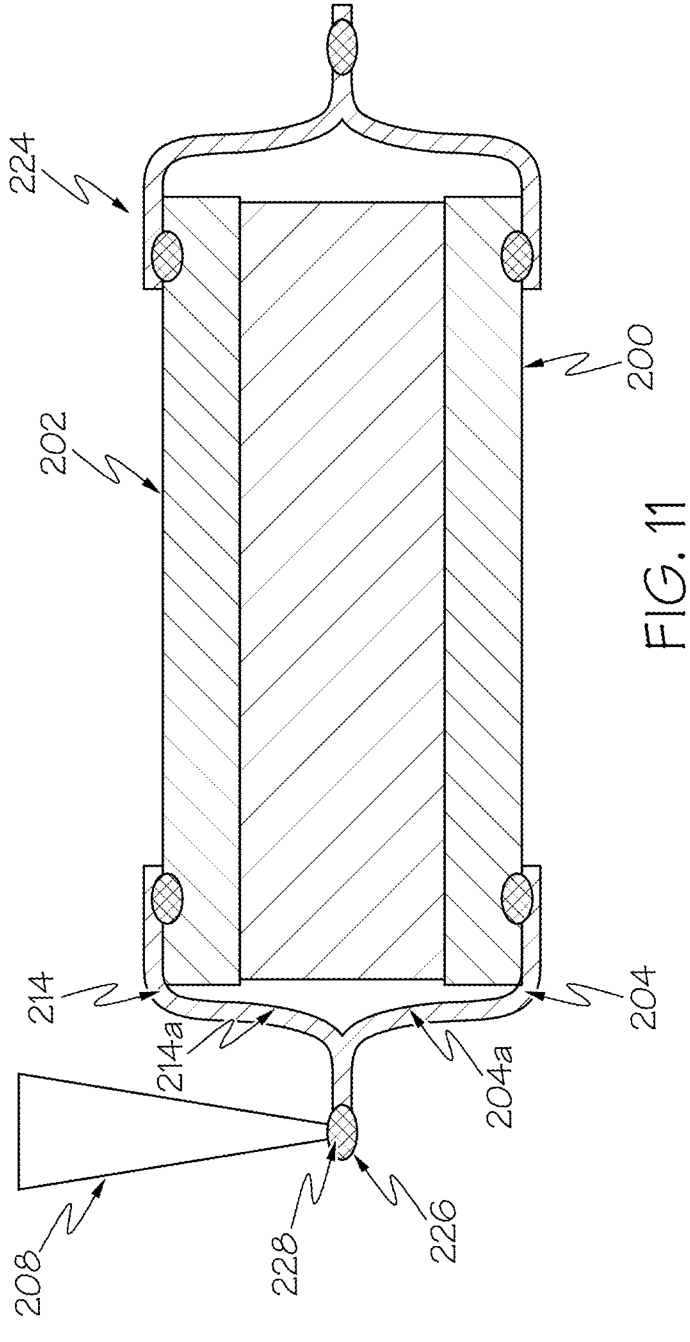
FIG. 11 schematically depicts another step of a method for sealing the glass assembly, according to one or more embodiments shown and described herein.

Referring back to FIG. 1 and as shown in FIG. 11 and at block 24, the first metal foil 204 and the second metal foil 214 may be sealed together to produce a hermetically sealed assembly 224. In embodiments, the hermetically sealed assembly 224 is created by joining the first metal foil 204 and the second metal foil 214 to one another. More particularly, the first surface 204*a* of the first metal foil 204 may be contacted with the first surface 214*a* of the second metal foil 214 to create a third contact location 226 between at least a portion of the first surface 204*a* of the first metal foil 204 and at least a portion of the first surface 214*a* of the second metal foil 214.

Once the third contact location 226 has been established between the first metal foil 204 and the second metal foil 214, a third welding step may be conducted to join the first metal foil 204 and the second metal foil 214. The third welding step may involve directing the laser beam 208 on one of the second surface 204*b* of the first metal foil 204 opposite the third contact location 226, or the second surface 214*b* of the second metal foil 214 opposite the third contact location 226. The laser beam 208 may act to bond the first metal foil 204 and the second metal foil 214 and form a third bond location 228 at the third contact location 226.

As may be understood in view of the foregoing, the method of sealing a glass assembly as described herein may alleviate the undesirable thermal related defects in bond regions which are common in hermetically sealed glass assemblies. Because the bond locations described herein are formed by focusing the laser beam directly on the metal foil, the laser beam does not pass through an additional glass substrate and/or polymer layer prior to forming the bond location, which prevents the laser beam from being exposed to defects which are not transparent to the wavelength of the laser beam. Furthermore, because the glass assembly is flipped between welding steps, the need to offset the laser beam prior to performing the second welding step is alleviated.

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of sealing a glass assembly comprising a first glass substrate and a second glass substrate, the method comprising:

positioning a first surface of the first glass substrate adjacent to a first surface of the second glass substrate;

contacting a second surface of the first glass substrate with a first surface of a first metal foil to create a first contact location between at least a portion of the second surface of the first glass substrate and the first surface of the first metal foil;

conducting a first welding step by directing a laser beam on a second surface of the first metal foil opposite the first contact location to bond the first glass substrate to the first metal foil and form a first bond location at the first contact location;

rotating the glass assembly 180 degrees about a longitudinal axis of the glass assembly;

contacting a second surface of the second glass substrate with a first surface of a second metal foil to create a second contact location between at least a portion of the second surface of the second glass substrate and the first surface of the second metal foil; and conducting a second welding step by directing the laser beam on a second surface of the second metal foil opposite the second contact location to bond the second glass substrate to the second metal foil and form a second bond location at the second contact location, wherein:

the first metal foil and the second metal foil each have a thickness greater than or equal to 3 μm and less than or equal to 50 μm; and the laser beam comprises a pulsed laser comprising a pulse energy greater than or equal to 2.8 μJ and less than or equal to 1000 μJ and the first metal foil and the second metal foil are substantially opaque to the wavelength of the laser beam.

2. The method of claim 1 further comprising:

positioning the glass assembly between an optical flat and a platen prior to conducting the first welding step; and compressing the glass assembly between the optical flat and the platen prior to the first welding step, wherein the laser beam is directed through the optical flat and onto the second surface of the first metal foil during the first welding step.

3. The method of claim 2 further comprising:

positioning the glass assembly between the optical flat and the platen after the rotating the glass assembly 180 degrees about a longitudinal axis of the glass assembly and prior to conducting the second welding step; and compressing the glass assembly between the optical flat and the platen after the rotating the glass assembly 180 degrees about the longitudinal axis of the glass assembly and prior to conducting the second welding step, wherein the laser beam is directed through the optical flat and onto the second surface of the second metal foil during the second welding step.

4. The method of claim 3 wherein the compressing the glass assembly comprises applying a compression force to the glass assembly with the platen, wherein the compression force is greater than or equal to 100 kPa and less than or equal to 350 kPa.

5. The method of claim 1, wherein, during the first welding step, an optical path of the laser beam does not pass through a thickness of the first glass substrate or a thickness of the second glass substrate.

6. The method of claim 1, wherein, during the second welding step, an optical path of the laser beam does not pass through a thickness of the first glass substrate or a thickness of the second glass substrate.

7. The method of claim 1, further comprising sealing the first metal foil to the second metal foil.

8. The method of claim 7 wherein sealing the first metal foil to the second metal foil comprises:

contacting a first surface of the first metal foil with a first surface of the second metal foil to create a third contact location between at least a portion of the first surface of the first metal foil and at least a portion of the first surface of the second metal foil; and conducting a third welding step by directing the laser beam on one of a second surface of the first metal foil opposite the third contact location or a second surface of the second metal foil opposite the third contact location to bond the first metal foil to the second metal foil and form a third bond location at the third contact location.

9. The method of claim 1, wherein:

the first metal foil and the second metal foil each comprise a central aperture prior to the first welding step and the second welding step;

the first bond location circumscribes the central aperture of the first metal foil;

the second bond location circumscribes the central aperture of the second metal foil; and the central aperture of the first metal foil at least partially overlaps with the central aperture of the second metal foil.

10. The method of claim 1, wherein the first glass substrate and the second glass substrate are spaced apart from one another such that a cavity is disposed between the first glass substrate and the second glass substrate.

11. The method of claim 1, wherein at least one of the first bond location and the second bond location have a maximum bond depth less than or equal to 600 μm.

12. The method of claim 1, wherein the first bond location and the second bond location have a bond width greater than or equal to 5 μm and less than or equal to 100 μm.

13. The method of claim 1, wherein the wavelength of the pulsed laser is greater than or equal to 300 nm and less than or equal to 1100 nm.

14. The method of claim 1, wherein the pulsed laser is a nanosecond pulsed laser, a picosecond pulsed laser, or a femtosecond pulsed laser.

15. The method of claim 1, wherein the pulsed laser has a pulse repetition rate greater than or equal to 5 kHz and less than or equal to 1 MHz.

16. The method of claim 1, wherein the pulsed laser has a spot size greater than or equal to 5 μm and less than or equal to 100 μm.

17. The method of claim 1, wherein the first glass substrate and the second glass substrate comprise a refractive index greater than or equal to 1.4 and less than or equal to 2.4.

18. The method of claim 1, wherein the first glass substrate and the second glass substrate comprise a glass or glass-ceramic comprising borate glass, silicoborate glass, phosphate-based glass, silicon carbide glass, soda-lime silicate glass, aluminosilicate glass, alkali-aluminosilicate glass, borosilicate glass, alkali-borosilicate glass, alumino-borosilicate glass, alkali-alumino-borosilicate glass, or alkali-aluminosilicate glass.

19. The method of claim 1, wherein at least one of the first metal foil and the second metal foil comprises aluminum, aluminium alloys, stainless steel, nickel, nickel alloys, silver, silver alloys, titanium, titanium alloys, tungsten, tungsten alloys, gold, gold alloys, copper, copper alloys, bronze, iron, or a combination thereof.

20. The method of claim 1, wherein at least one of the first metal foil and the second metal foil comprises a melting point less than or equal to 1800° C.

* * * * *